Patented Sept. 23, 1952

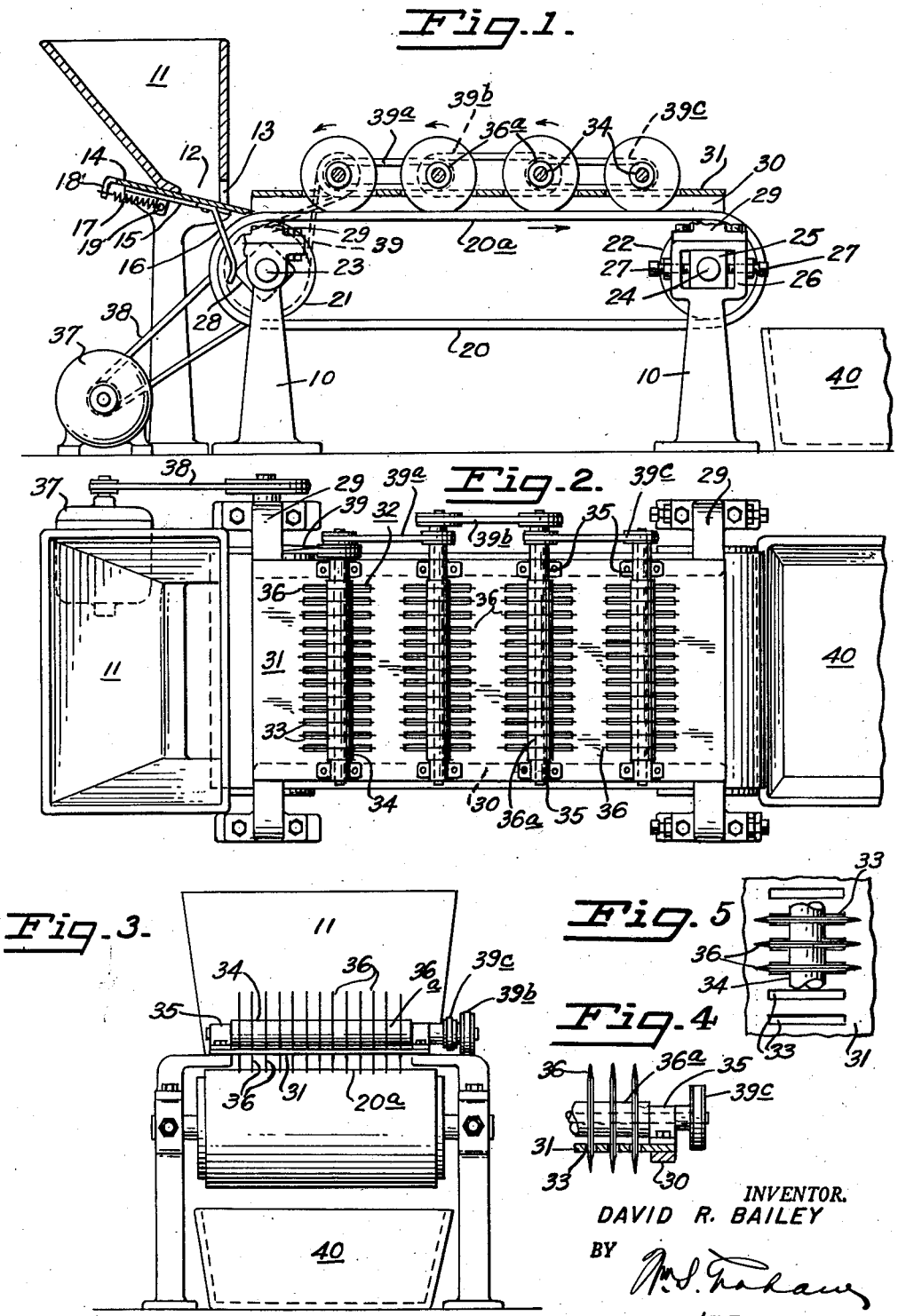

2,611,405

UNITED STATES PATENT OFFICE 2,611,405

APPARATUS FOR CUTTING ALMONDS TO PIECES OF MISCELLANEOUS SIZES

David R. Bailey, Sacramento, Calif., assignor to California Almond Growers Exchange, Sacramento, Calif., a corporation of California Application June 14, 1948, Serial No. 32,914

1 Claim. (Cl. 146—98)

This invention relates to improvements in method and apparatus in making cut nutmeats such as almond kernel granules; the invention also relates particularly to the treatment of the nutmeats prior and subsequent to passing them through the improved apparatus, for cutting them into miscellaneously sized pieces or granules. When other edible nutmeats may also be subject to the process and handled through the apparatus, almonds are fairly representative of edible nutmeats as a class, and also present a problem of brittleness when dried, which is not so pronounced in most other nutmeats. The invention is therefore described with relation to the treatment of almonds.

Almond kernels and other nutmeats cut into miscellaneous sized pieces are useful for many purposes for making candy, pastries and other confections, bakery products and the like. These uses may also utilize almond kernels which, though reasonably perfect in the quality in the meat of the nut, are odd-shaped or broken, or have blemishes of appearance, though this invention is adapted advantageously to meet all conditions wherein almonds cut to miscellaneous size pieces or granules may be desirable. Therefore it is advantageous to provide a method and apparatus whereby such a product may be produced economically and efficiently by continuous steps of operation.

As is well known, it is customary to harvest the almond nut from the tree in a husk and shell, remove the husk and dry or cure the almond nut in its shell, and to store the almonds in the shell until they are desired for use. The nutmeats are better preserved and insured against molding and rancidity in this manner when not exposed to atmospheric conditions.

When freshly harvested the kernels have a degree of pliability so that they are not crunchy or brittle, but when dried they become relatively hard, crunchy and brittle, and cutting, grinding or granulating them in this latter condition by any presently known method produces an objectionable amount of fines or comminuted meal of greatly reduced value. Therefore, a step in the present process is to restore the pliability of the kernels prior to cutting kernels into granules or relatively small pieces, since cutting while pliable, if not totally eliminating, at least greatly reduces, the objectionable fines.

Since the almond kernels are usually referred to in commercial parlance merely as almonds, the practice of the process and specifications herein generally employs the term "almonds" to indicate the kernels of the nuts.

Among the objects of the invention are to provide a method and apparatus for treating dried almonds to restore pliability, cut them as desired into granules of miscellaneous sizes and subsequently remove the induced pliability from the severed pieces.

A further object is to provide apparatus for severing almonds into granules by continuous operation.

Another object is to provide an apparatus and a method for severing relatively large batches of almonds into granules by continuous mechanical steps of operation.

With the foregoing and other objects in view, which will be apparent from or further explained herein, one form of practicing the process of the invention, and an embodiment of a suitable apparatus therefor are described herein in connection with the accompanying drawing illustrative of one advantageous form of apparatus which may be employed, it being understood that variations may be resorted to without departing from the spirit of the invention which is defined in the appended claim.

In the drawing:

Fig. 1 is a longitudinal vertical side elevation of apparatus of the invention partly in section.

Fig. 2 is a plan view of apparatus of the invention, partly shown fragmentarily.

Fig. 3 is an end elevation of apparatus of the invention.

Fig. 4 is a fragmentary enlarged view of a portion of apparatus of Fig. 3.

Fig. 5 is a fragmentary enlarged view of a portion of apparatus of Fig. 2.

Since a portion of the steps of the method are performed in connection with use of apparatus, the steps of the method will be further explained in connection with operation of the apparatus.

Referring to the drawing in which like reference characters indicate corresponding parts in the several views, 10 indicates two pairs of vertical relatively spaced supports, a pair supporting each opposite end of an assembly of a conveyor belt and cutting knife which will be further described. At one end of the belt and knife assembly is a feed hopper 11 having at its bottom a discharge feed opening 12, the front portion of which adjacent the belt assembly providing an elongated opening 13 of proper size to permit ready passage therethrough of almonds from the hopper to the belt assembly.

Underlying the discharge opening 12 of the hopper is a downwardly inclined shaker plate 14 mounted for vibratory reciprocation in tracks 15. The downward incline of the shaker plate is less than the angle of free slippage of the almonds, and requires vibration to jar the almonds down the incline of the plate. Any suitable vibratory means may be employed. In the exemplification herein, the plate has connected to its underside an arm 16 for cam engagement whereby the plate is vibrated against compression of a coil spring 17, one end of which bears against a flange 18 on the plate, and the other end of which bears against a lug 19 on the track 15.

The assembly of the conveyor belt and knives comprises a continuous horizontally disposed longitudinal conveyor belt 20, the upper conveying flight of which is indicated 20a. The belt is of flexible non-slip material, such as tough rubber reinforced with textile threads, which is a well-known commercial belt product, and which may be termed a somewhat yieldably resilient body, the material susceptible to surface penetration by a cutting knife. At its opposite ends the belt is mounted for rotational movement around rollers 21 and 22, the rollers being mounted upon and rotated by relatively longitudinally spaced parallel shafts 23 and 24, journaled in the supports 10. The journal box 25 of one of the roller shafts is longitudinally adjustable at one end of the belt for loosening and tightening the belt longitudinally, as by mounting the journal boxes slidably in a clamp bracket 26 at an upper portion of the support and providing regulating set screws 27 in the side walls thereof.

Any suitable means may be employed to vibrate the shaker plate. For example, plate 14 may carry a cam 28 for rotation therewith, the cam having cam face of any suitable shape, the peaks of which intermittently engage and move the arm 16 of the shaker plate and thus reciprocate the shaker plate against the compression of spring 17. When the compression is released, the plate snaps back to normal position responsive to the compression of spring 17, and thereby provides the vibration or shaking of the plate for loosely and haphazardly feeding the almonds in indefinite arrangement to the belt by a jarring or jogging movement.

The pairs of supports 10 at opposite ends of the belt assembly are each provided at their upper ends with vertically disposed posts or standards 29 which the pairs at each opposite end having their free ends turned inwardly toward each other and at said free ends they support elongated longitudinal beams 30 overlying and parallel with and close to the opposite side edges of the belt, thus serving as side walls to prevent almonds on the belt from falling from the side edges thereof, and further serving as mounting supports for a slotted plate 31 which overlies in spaced relation the width and length of the upper flight face 20a of the belt between the end rollers. The plate 31 has a plurality of longitudinally spaced rows of slots generally indicated 32, which are positioned over the belt and spaced from the end rollers, each row comprising a plurality of slots 33 relatively spaced transversely of the plate, and therefore, also transversely of the underlying belt.

Above the plate 31 and transversely thereof there are a plurality of longitudinally spaced knife arbors 34 parallelly overlying and spaced from the plate, and likewise overlying and spaced from the upper flight 20a of the belt and spaced from the end rollers. The opposite ends of the knife arbors are journaled for rotation in bearings 35 secured to the side edges of the plate 31, and supported by the longitudinal beams 30.

Upon each knife arbor 34, adjustably mounted for rotation therewith, are a plurality of relatively spaced disc knives 36, the lower portion of the blade of each knife extending through one of the slots 33 of plate 31. The knives are, therefore, spaced transversely of the belt and are movably adjustable axially on the several arbors by predetermined width of spacing collars 36a therebetween. Since the knife arbor is spaced above the plate, the slots 33 are not required to be as long as the full diameter of the knives 36. The knives rotate towards the belt at the cutting edge which is initially contacted by the almonds, that is, they rotate counterclockwise with the feed of the almonds being from left to right as shown in Fig. 1 by the arrow indicating direction of movement of the upper flight 20a of the conveyor belt.

The cutting edges of knives 36 superficially contact the adjacent face of the upper flight 20a of belt 20, and in fact may, and preferably do, barely penetrate the face of the belt about 1/64 of an inch or less, just enough to insure the complete cutting of the almonds fed to the knives upon the belt. Such contact is desirable since the belt is somewhat resilient and it is desired that the resilience of the belt shall not inhibit the complete cutting action of the knives. The belt being of non-slip character, when the almonds are first engaged by the cutting edge of the knife, they are held by the belt rather than slipping away from the knife. Each of the successive transverse rows of knives, therefore, is a cutting station, of which there may be any suitable number, four being shown on the drawing.

Any suitable drive means may be employed for rotating the rollers 21, 22 and knives 36, and the cam 28. A conventional drive train is shown in the drawing as motor 37, belt 38 to shaft 23, which rotates cam 28. The shaft 23 drives belt 20 around the opposite roller, and also drives the belt 39 which is twisted to reverse the direction of rotation of the knives 34 through a succession of knife belts 39a, 39b, and 39c, whereby the knives rotate in opposite direction relative to the belt rollers.

In operation of the apparatus and practice of the method, the almonds which have previously been dried and have the characteristic of being brittle, crunchy and shatterable, are first subjected to steps which restore their pliability, so that in cutting them the objectionable fines, if not eliminated, are greatly reduced in relative quantity. This may be accomplished in several ways, three of which are stated herein.

A first method of restoring or inducing pliability to the dried almond kernels is to immerse them in cold water for a short time, for example, approximately five seconds, preferably in relatively large batches, such as 100 pounds, enveloped in a porous burlap bag, after which the immersed almonds are permitted to remain wetted in the same container for approximately 12 hours which is ample time for the moisture to penetrate through the body of the nut and restore its pliability for cutting.

A second and quicker, though somewhat more expensive, method of inducing or restoring pliability is to expose a similar sized batch of the dried almond kernels to wet steam for approximately 10 minutes in a closed container which likewise moistens the almonds throughout the body and restores the pliability thereof, and thereafter the almonds may be cut immediately.

A third method of inducing or restoring the pliability of the kernels takes into account the latent moisture and oil in the dried almonds. It has been found by experience that the pliability of the dried almonds may also be restored by heating the dried almonds in a non-aerated container, that is, without exhausting the air therein which is moistened by the heated almonds. Preferably a rotating drum is employed in which the temperature of the almonds is raised to substantially 200 degrees F., for approximately 20 minutes, after which they may be immediately cut while still retaining the heat.

After inducing or restoring the pliability to the almonds, a quantity thereof, so treated, are dumped into the hopper 11 and fed by gravity through the discharge opening 13 to the shaker plate, which upon being vibrated, levels the almonds thereon to a single layer and jars or jogs them down the incline of the plate and deposits them loosely and at random or haphazard positions on the upper flight 20a of the conveyor belt. The movable conveyor belt conveys the almonds thereon to the knives 36 which, being rotated towards the belt at the almond-receiving edge, engage the almonds against the resilient non-slip face of the belt and sever them to miscellaneously sized pieces or granules, the overlying plate 31 preventing the pieces from being thrown upwardly or out of the apparatus, and the slots 33 serving to clear the knives of nut portions which might wedge between adjacent knife blades, while the elongated side beams 30 preventing the almonds from discharging at the side edges of the belt.

Since the cutting edges of the knives superficially contact the belt, it is obvious that almond pieces of greater size than the space between the knives will not pass the knives without being severed. While the exact sizes of the cut pieces cannot be predetermined, the dimensions of the cut pieces may be controlled to a reasonable extent by adjusting the relative transverse spacing of the cutting knives on the arbors and the number of times the almonds are fed through the cutting apparatus. If desired, the cut pieces may be screened at the end of a run and the larger pieces only again run through the apparatus.

After the almonds have been severed, they are discharged at the end of the belt into a bin 40.

Following the cutting operation, the cut pieces to which moisture has been added by either of said first or second methods of restoring pliability, are dried to remove the moisture theretofore absorbed. The drying may be accomplished by exposing the cut granule pieces to artificial heat on trays for a period from 2½ to 3 hours at temperature of 130 to 140 degrees F. To hasten the drying process, artificial heat of substantially 200 degrees F. may be employed in exposing the almonds for approximately one hour while transporting them on conveyor belts, preferably employing infra-red lamps. The stated times and temperatures are to be understood as being approximate as affording an example satisfactory for accomplishing the desired result of removing the induced pliability to restore the previous crunchy brittle characteristics to the dried cut pieces.

Where the third of said methods of restoring pliability is employed, that is, the subjecting of the dried almond kernels to heat in a non-aerated container, it is not necessary to again subject them to heat for drying after they have been cut, but rather it is only necessary to permit the cut pieces to cool to normal temperature, which restores the original crunchy, brittle characteristics.

After the cut almond pieces have their induced pliability removed, they are packed in suitable containers for distribution, though they may, if desired, be first screened for removal of any chaff which may be present or for selectivity as to size, or for any other purpose of segregation of the pieces.

Having described the invention, what is claimed as new and patentable is:

An apparatus for cutting almonds or the like into granules of miscellaneous sizes comprising; a pair of relatively horizontally spaced rotatable end rollers, a movable conveyor belt mounted around said rollers for conveying nutmeats to be cut, the belt having a smooth conveying surface of resilient material, a feed means adapted to feed the meats to the belt in haphazard random arrangement, a cover plate overlying and spaced above the flight of the belt which conveys the meats, said plate having intermediate the end rollers a series of longitudinally spaced rows of transversely relatively spaced slots therein, a series of longitudinally spaced rows of rotatable knives, said rows of knives being relatively spaced between the end rollers of the belt, the knives in the rows being relatively spaced transversely of the belt, the space between adjacent knives being less than the smaller dimension of the almonds, means for rotating the knives toward the belt at the cutting edge to which the meats are initially fed by the belt, the cutting edges of the knives extending through the slots of said slotted plate and superficially penetrating into the adjacent face of the belt, and longitudinal strips overlying the opposite longitudinal edges of the belt throughout the length of the conveyor face of the belt.

DAVID R. BAILEY.

REFERENCES CITED

The following references are of record in the file of this patent:

UNITED STATES PATENTS

| Number | Name | Date |
| --- | --- | --- |
| 735,662 | Gent | Aug. 4, 1903 |
| 1,350,506 | Kennedy | Aug. 24, 1920 |
| 1,664,334 | Thompson | Mar. 27, 1928 |
| 1,703,123 | Triplett | Feb. 26, 1929 |
| 1,988,901 | Hoefling | Jan. 22, 1935 |
| 2,092,103 | Blakeney et al. | Sept. 7, 1937 |
| 2,160,693 | Anstice | May 30, 1939 |
| 2,234,841 | Holmes | Mar. 11, 1941 |
| 2,333,576 | Kerr | Nov. 2, 1943 |
| 2,506,117 | Stiefvater | May 2, 1950 |